United States Patent
Kim et al.

(10) Patent No.: US 9,098,701 B2
(45) Date of Patent: Aug. 4, 2015

(54) APPLICATION MODULE INJECTION DEVICE, COMPUTING DEVICE INCLUDING APPLICATION MODULE INJECTION FUNCTION, AND RECORDING MEDIUM FOR RECORDING PROGRAM FOR EXECUTING APPLICATION MODULE INJECTION METHOD

(75) Inventors: Jong-Young Kim, Seoul (KR); Jong-Il Lee, Goyang-si (KR)

(73) Assignee: FASOO.COM CO., LTD, Seoul (KR)

( * ) Notice: Subject to any disclaimer, the term of this patent is extended or adjusted under 35 U.S.C. 154(b) by 244 days.

(21) Appl. No.: 13/823,642

(22) PCT Filed: Dec. 8, 2010

(86) PCT No.: PCT/KR2010/008744
§ 371 (c)(1),
(2), (4) Date: Mar. 14, 2013

(87) PCT Pub. No.: WO2011/159005
PCT Pub. Date: Dec. 22, 2011

(65) Prior Publication Data
US 2014/0150103 A1 May 29, 2014

(30) Foreign Application Priority Data

Jun. 15, 2010 (KR) ........................ 10-2010-0056506

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 21/56 | (2013.01) |
| G06F 9/445 | (2006.01) |
| G06F 9/44 | (2006.01) |

(52) U.S. Cl.
CPC ................ G06F 21/56 (2013.01); G06F 9/445 (2013.01); G06F 9/4425 (2013.01)

(58) Field of Classification Search
CPC ............ G06F 17/30144; G04F 21/125; G04F 21/126; G04F 21/6281
See application file for complete search history.

(56) References Cited

U.S. PATENT DOCUMENTS 6,591,379 B1    7/2003 LeVine
2006/0112037 A1    5/2006 Chagoly
(Continued)

FOREIGN PATENT DOCUMENTS

KR        1020090017942 A    2/2009

OTHER PUBLICATIONS

Rob Sinclair, "Microsoft Active Accessibility: Architecture", May 2000, http://msdn.microsoft.com/en-us/library/ms971310.aspx.*

Primary Examiner — Peter Poltorak
Assistant Examiner — Quy Pham
(74) Attorney, Agent, or Firm — William Park & Associates Ltd.

(57) ABSTRACT

Provided are an application module injection device, a computing device including an application module injection function, and a recording medium that records a program for executing an application module injection method. The application module injection device includes a function registration unit configured to register, in an operating system (OS), a first callback function for receiving a notice about whether a process corresponding to a program whose execution is instructed by a user is created from the OS and a second callback function for receiving a notice about whether an image corresponding to the program whose execution is instructed by the user is driven, a process information acquisition unit configured to receive the notice about whether the process corresponding to the program whose execution is instructed by the user is created from the OS through the first callback function, a process determination unit configured to select a process generated so as to correspond to the program whose execution is instructed by the user as an application module injection target process when the program whose execution is instructed by the user, which is determined through the second callback function, corresponds to a predetermined type of program, a context change unit configured to change a first entry point included in a context of a thread corresponding to the application module injection target process into a second entry point of an injected application module, and an application module injection unit configured to inject the application module into the application module injection target process.

6 Claims, 6 Drawing Sheets

(56) References Cited

U.S. PATENT DOCUMENTS

| | | |
|---|---|---|
| 2006/0282827 A1* | 12/2006 | Yeap et al. .................... 717/130 |
| 2007/0214461 A1 | 9/2007 | Glatron |
| 2008/0046977 A1* | 2/2008 | Park ................................. 726/4 |
| 2008/0226069 A1* | 9/2008 | Tan ................................ 380/255 |
| 2008/0295081 A1 | 11/2008 | Albot |
| 2009/0064348 A1* | 3/2009 | Bang et al. ....................... 726/33 |
| 2009/0241109 A1 | 9/2009 | Vandegrift |

* cited by examiner

APPLICATION MODULE INJECTION DEVICE, COMPUTING DEVICE INCLUDING APPLICATION MODULE INJECTION FUNCTION, AND RECORDING MEDIUM FOR RECORDING PROGRAM FOR EXECUTING APPLICATION MODULE INJECTION METHOD

TECHNICAL FIELD

The present invention relates to an application module injection device, a computing device including an application module injection function, and a recording medium for recording a program for executing an application module injection method, and more particularly, to a device for injecting an application module having a specific function in an area of a process relating to a corresponding execution program in an execution process of an execution program, a computing device having an application module injection function, and a recording medium for recording a program for executing an application module injection method.

BACKGROUND ART

In order to add an arbitrary function (for example, malicious code detection function, digital copyright management function, etc.) to an application program that does not have a source code or is commercially available, hooking technologies should be used. In this instance, an operation of enabling a specific function module to penetrate into an address space of a process corresponding to a corresponding application program is referred to as "injection" or "insertion".

Meanwhile, in an operating system (OS) of a protection mode environment, as existing methods proposed in order to inject a module performing a specific function into an area of a process corresponding to an application program, a method of using a registry (AppInt_DLLs), a method of using a window hooking function (SetWindowsHook), a method of using a remote thread (CreatRemoteThread), a method of using a kernel callback function (Process Create Notify Callback+CreateRemoteThread), and the like may be given. However, the method of using the registry may be applicable only to an application program using User32.dll, and the method of using the window hooking function may not be applicable to an imperative execution program that does not use a graphic user interface (GUI). In addition, the method of using the remote thread may not be applicable to a program that is newly executed, and the method of using the kernel callback function may have exceptions that occur due to a point of time problem. Furthermore, in the conventional injection method described above, a separate remedy for a user account control (UAC) function is required with respect to OSs such as Vista, Windows 7, and the like.

DISCLOSURE

Technical Problem

The present invention is directed to providing an application module injection device that may inject a module for performing a specific function regardless of an operating point of time and situation of an operating system (OS) associated with execution of an application program into a specific space of a process corresponding to the application program, and an information processing device having an application module injection function.

The present invention is also directed to providing a computer-readable recording medium that may record a program for executing, in a computer, an application module injection method of an information processing device that can inject a module for performing a specific function regardless of an operating point of time and situation of an OS associated with execution of an application program into a specific space of a process corresponding to the application program.

Technical Solution

One aspect of the present invention provides an application module injection device, comprising: a function registration unit configured to register, in an operating system (OS), a first callback function for receiving a notice about whether a process corresponding to a program whose execution is instructed by a user is created from the OS and a second callback function for receiving a notice about whether an image corresponding to the program whose execution is instructed by the user is driven; a process information acquisition unit configured to receive the notice about whether the process corresponding to the program whose execution is instructed by the user is created from the OS through the first callback function; a process determination unit configured to select a process generated so as to correspond to the program whose execution is instructed by the user as an application module injection target process when the program whose execution is instructed by the user, which is determined through the second callback function, corresponds to a predetermined type of program; a context change unit configured to change a first entry point included in a context of a thread corresponding to the application module injection target process into a second entry point of an injected application module; and an application module injection unit configured to inject the application module into the application module injection target process.

Another aspect of the present invention provides a computing device comprising: a processor configured to execute an OS and an injection module; and a memory configured to store the OS and the injection module, wherein the injection module includes a function registration module configured to register, in the OS, a first callback function for receiving a notice about whether a process corresponding to a program whose execution is instructed by a user is created from the OS and a second callback function for receiving a notice about whether an image corresponding to the program whose execution is instructed by the user is driven, a process information acquisition module configured to receive the notice about whether the process corresponding to the program whose execution is instructed by the user is created from the OS through the first callback function; a process determination module configured to select a process generated so as to correspond to the program whose execution is instructed by the user as an application module injection target process when the program whose execution is instructed by the user, which is determined through the second callback function, corresponds to a predetermined type of program; a context change module configured to change a first entry point included in a context of a thread corresponding to the application module injection target process into a second entry point of an injected application module, and an application module injection module configured to inject the application module into the application module injection target process.

Still another aspect of the present invention provides a computer-readable recording medium that records a program for executing an application module injection method in a computer, wherein the application module injection method includes (a) receiving, from an OS, a notice about whether a process corresponding to a program whose execution is instructed by a user is created, (b) receiving, from the OS, a notice about whether an image corresponding to the program whose execution is instructed by the user is driven, (c) selecting a process generated so as to correspond to the program whose execution is instructed by the user as an application module injection target process when the program whose execution is instructed by the user corresponds to a predetermined type of program, (d) changing a first entry point included in a context of a thread corresponding to the application module injection target process into a second entry point of an injected application module, and (e) injecting the application module into the application module injection target process.

Advantageous Effects

An application module injection device, a computing device including an application module injection function, and a recording medium that records a program for executing an application module injection method according to an exemplary embodiment of the present invention may inject a module performing a specific function in a specific space of a process corresponding to an executed application program based on a process creation flow of an operating system (OS), whereby injection of the module performing the specific function is made possible without the help of a separate agent operated in a separate user mode. In addition, when the OS is Windows, an injection module may be operated simultaneously with booting of Windows, and conflict with an existing injection method may be minimized. Furthermore, it is possible to cope with a multi-core central processing unit, and to inject an application module by the same method regardless of a type and a processing ability of the OS. In addition, it is possible to inject an application module in all processes at a predictable single point of time using a single method, thereby stably performing application module injection.

MODES OF THE INVENTION

Hereinafter, an application module injection device, a computing device including an application module injection function, and a recording medium that records a program for executing an application module injection method according to a preferred embodiment of the present invention will be described in detail with the accompanying drawings.

In the following descriptions, the terms "component" and "system" refer to a computer-related entity corresponding to any one of hardware, a combination of hardware and software, software, and executed software. For example, the component may be a process, an object, an executable thing, an execution thread, a program, and a computer which are operated on a processor, but is not limited thereto. As an example, the component may be both an application operated on a server and the server. At least one component may reside in a process, an execution thread, or the like, and may be in a single computer, or may be distributed in a plurality of computers.

An application programming interface (API) is an interface for enabling an application program to use a function provided by an operating system (OS), and as an example, Win32 API may enable an application program to use thousands of functions provided by the Microsoft Windows OS. Hereinafter, Win32 API provided in the Microsoft Windows OS will be described for convenience of description, but the present invention does not presuppose the Windows OS. Accordingly, the present invention is operated to correspond to a creation flow of a process corresponding to a program whose execution is instructed by a user in a corresponding OS to which the present invention is applied regardless of a type of the OS.

Figure 1:
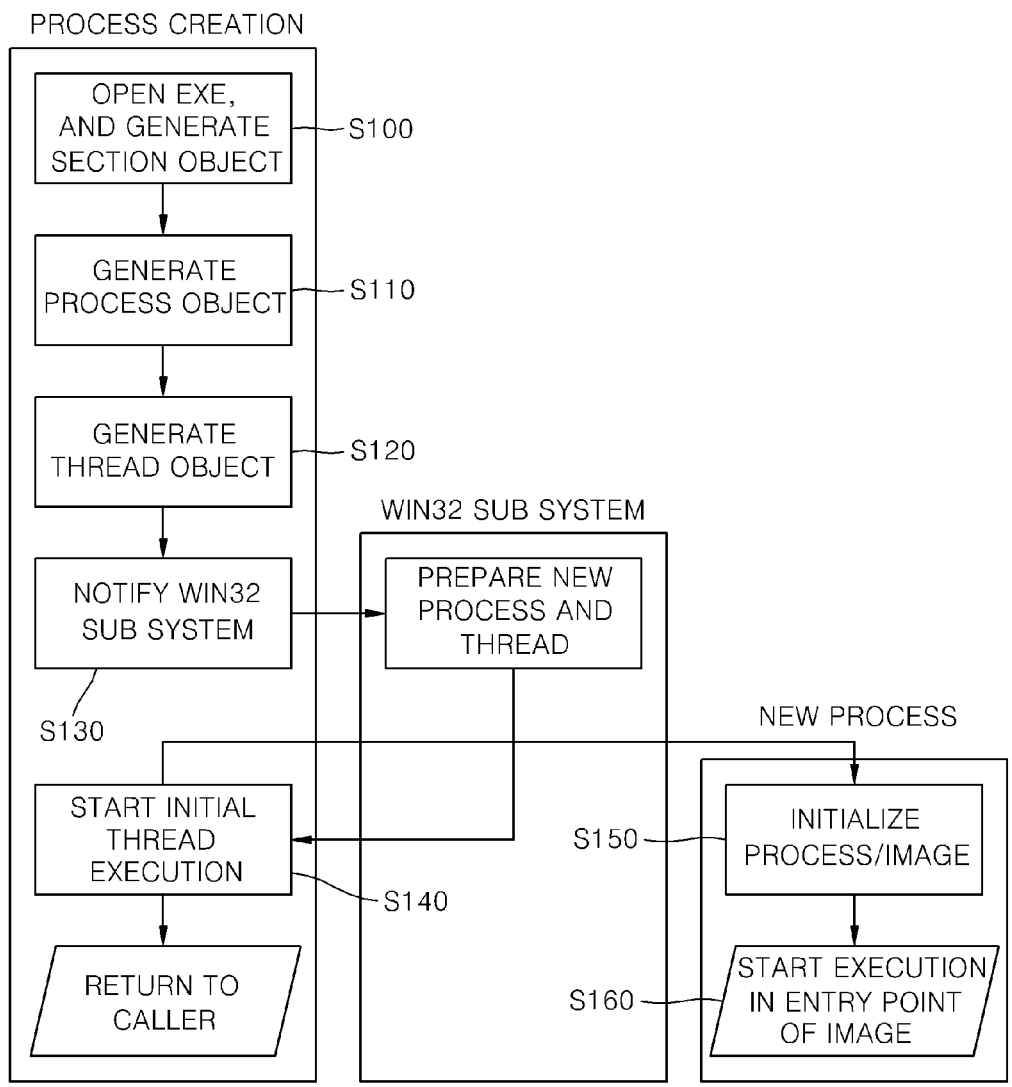
FIG. 1 is a drawing showing a process of generating a process of Win32 API when the Microsoft Windows operating system receives an input of an execution command of an application program from a user.

FIG. 1 is a drawing showing a process of generating a process of Win32 API when the Microsoft Windows OS receives an input of an execution command of an application program from a user.

Referring to FIG. 1, in step S100, when a user enters a command so as to execute a specific program, an OS opens an executable file (that is, a file having an extension name of "exe") of a corresponding program and generates a section object. Next, in step S110, the OS generates an execution process object corresponding to a corresponding program. In this process, the OS allocates and initiates an executive process (EPROCESS) that is a process kernel object. In addition, the OS allocates and initiates a kernel process (KPRCESS) that is an object including basic information required for thread scheduling of a kernel after generating an initial process address space, and terminates setting of the process address space. In addition, the OS initiates a process environment block (PEB) that is a process environment object in a system space as a data structure associated with the EPROCESS object, and then terminates setting of the execution process object.

Next, in step S120, the OS generates an initial thread object. In this instance, the OS allocates and initializes an executable thread (ETHREAD), a thread environment block (TEB), and a kernel thread (KTHREAD). In addition, the OS generates and initializes stack and context. Next, in step S130, the OS notifies a Win32 subsystem of information associated with an execution process object that is newly generated. In this instance, data notified from the OS to the Win32 subsystem is process related information such as a process, a thread handle, parent process ID (PPID), flag, and the like. The Win32 subsystem is a basic Windows subsystem, and enables a 32 bit application program to be operated, and provides a basic Windows user interface. Next, in step S140, the OS starts an initial thread. In this process, the OS constructs and starts an initial context of a kernel stack. Next, in step S150, the OS performs process initialization and image initialization in a context of a new process. In step S160, the OS loads DLLs required for the program whose execution is instructed by the user, and calls a DLL entry point to execute the program.

Meanwhile, the conventional module injection method may inject a module for performing a specific function into an application program whose execution is instructed by the user by a separate individual injection module that is operated in a user mode.

Figure 2:
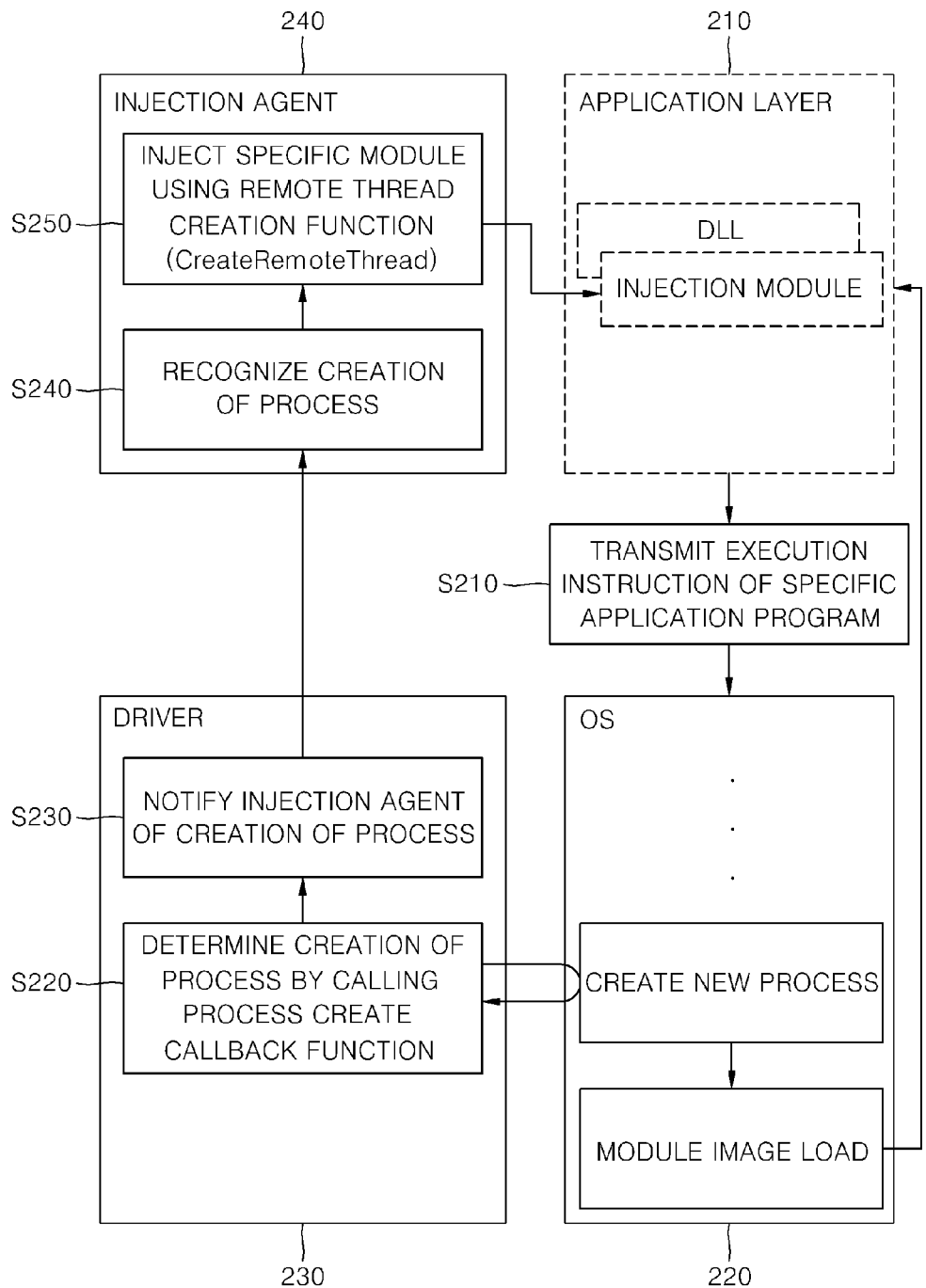
FIG. 2 is a drawing showing a conventional module injection structure.

In FIG. 2, such a conventional module injection structure is illustrated.

Referring to FIG. 2, in step S210, when a user instructs execution of a specific application program, an application layer 210 transmits a corresponding instruction to an OS 220. Next, in step S220, a driver 230 determines creation of a process corresponding to the specific application program from the OS 220 through process creation callback.

Next, in step S230, the driver 230 notifies an injection agent 240 operated in a user mode of the process creation using input and output control of the device.

Next, when the injection agent 240 receives the notice of the process creation from the driver 230 through the input and output control of the device in step S240, the injection agent 240 injects a module for performing a specific function using a remote thread creation function in step S250.

As described above, the injection module in the conventional module injection method is operated in the user mode, and therefore a separate agent is required. In addition, there is a problem that it is impossible to inject a module in a process that has already been started before the injection module is operated or a process that is quickly executed and terminated. In order to solve the problems of the conventional module injection method, the present invention has a structure that injects a module for performing a specific function using the notice of process creation and the notice of image load by an OS through the injection module operated in a kernel mode.

Figure 3:
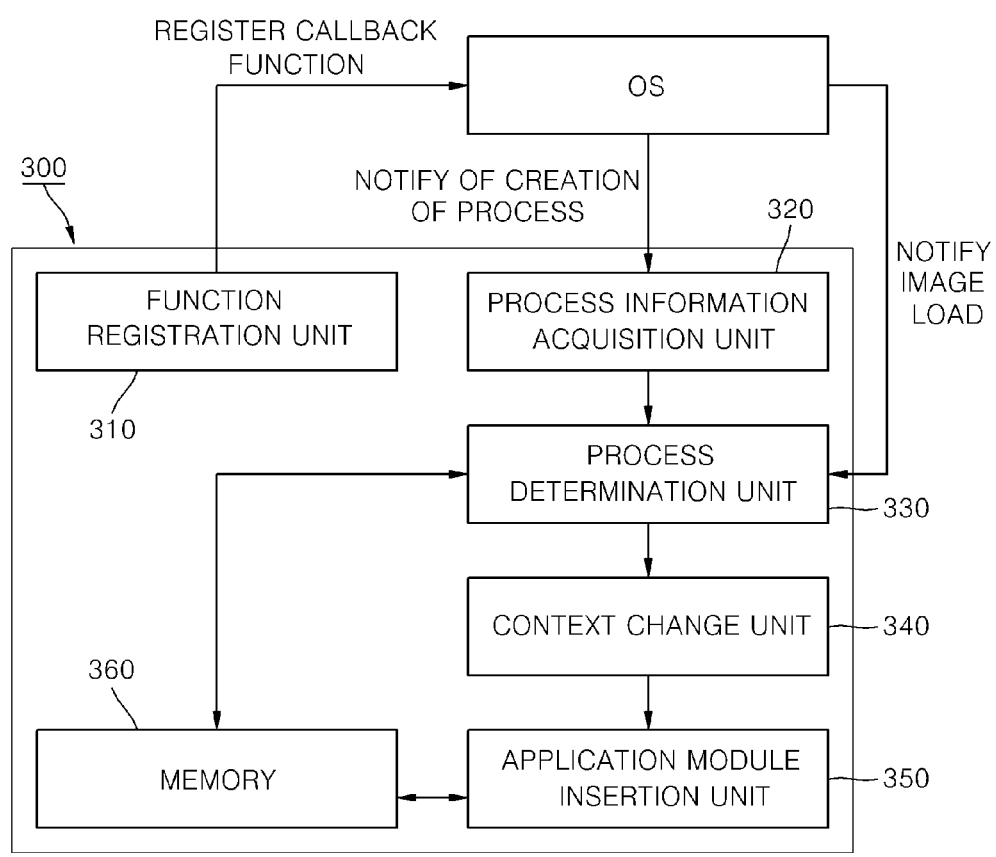
FIG. 3 is a block diagram showing a configuration of an application module injection device according to a preferred embodiment of the present invention.

FIG. 3 is a block diagram showing a configuration of an application module injection device according to a preferred embodiment of the present invention.

Referring to FIG. 3, an application module injection device 300 according to an embodiment of the present invention includes a function registration unit 310, a process information acquisition unit 320, a process determination unit 330, a context change unit 340, an application module injection unit 350, and a memory 360.

The function registration unit 310 registers, in an OS that is loaded in a memory of an information processing device such as a computer to which the present invention is applied and operated, a callback function (that is, process create notify callback) for receiving, from the OS, a notice about whether a process corresponding to a corresponding program is created when a user enters an execution instruction of a specific program and a callback function (that is, image load notify callback) for receiving a notice about whether an image corresponding to the corresponding program is driven. In this instance, a ProcessCallback function is a function that performs allocation of a process storage space for storing process information created when a process is created without any special conditions and performs an information storage process.

The process information acquisition unit 320 receives, from the OS, a notice about whether a process corresponding to a program whose execution is instructed by a user is created, using a callback function (that is, process create notify callback) registered in the OS.

The process determination unit 330 determines a type of the program whose execution is instructed by the user from the OS, using the callback function (that is, image load notify callback). The image load notify callback function is a function for receiving callback of a file format (that is, file type such as exe, dll, txt, dat, etc.) of the program whose execution is instructed by the user. Accordingly, the process determination unit 330 determines the type of the program whose execution is instructed by the user from the OS, and then controls to perform injection of an application module only when a predetermined type of program (for example, a program whose file format is exe) is executed. In addition, the process determination unit 330 determines whether the process input from the OS is a process in which injection of an application module has already been completed. When registering the callback function in the OS, the process information acquisition unit 320 receives a notice about creation information of all processes from the OS. Accordingly, when the application module has already been injected in the process that is newly notified from the OS, there is no need to repeatedly inject the application module. In order to solve this problem, the process determination unit 330 selectively manages only a process whose application module injection has not yet been performed among the process creation information that has been notified from the OS by the callback function with reference to a list of the processes whose injection has been completed. In this instance, the list of the processes whose injection has been completed is stored in the memory 360.

The context change unit 340 changes an entry point included in a context of a thread corresponding to the process created with respect to the program whose execution is instructed by the user into an entry point of an injected application module. In this process, the context change unit 340 acquires information about the entry point included in the corresponding context using a function for acquiring context information provided by the OS, and changes the entry point of the corresponding context using a function for changing the context information. In addition, the context change unit 340 secures a storage space for injecting a code (for example, a source code written in an assembly language) corresponding to the application module into an address space of a current process, and generates a module injection code to copy the generated code in a corresponding storage space. The context change unit 340 changes a start address stored in a corresponding context, and changes thread information associated with the start address.

The application module injection unit 350 injects the application module in the process corresponding to the program whose execution is instructed by the user. In this instance, the injected application module may be a code for managing a digital copyright for the program, a code for detecting a virus, or the like. In addition, the injected application module necessarily includes a routine for calling an original entry point included in a context of a thread corresponding to the created process that is acquired by the context change unit 340. Through the injection of the application module, the OS calls the entry point changed by the context change unit 340, and loads the injected application module. Next, the injected application module calls the original entry point included in the context of the thread corresponding to the process corresponding to the program whose execution is instructed by the user.

Figure 4:
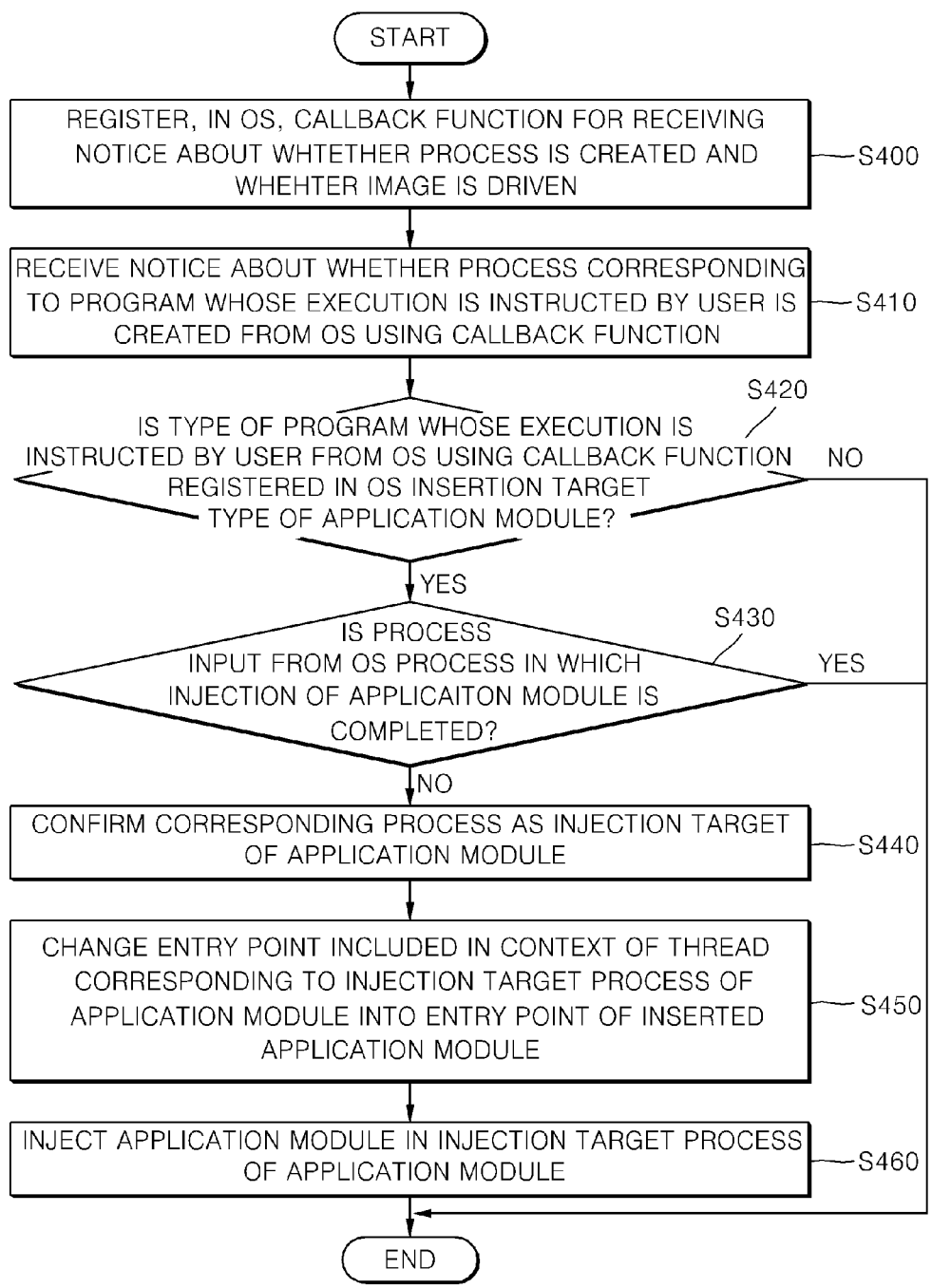
FIG. 4 is a flowchart showing an application module injection method in an application module injection device according to a preferred embodiment of the present invention.

FIG. 4 is a flowchart showing an application module injection method in an application module injection device according to a preferred embodiment of the present invention.

Referring to FIG. 4, in step S400, the function registration unit 310 registers, in an OS that is operated which is loaded in a memory of an information processing device such as a computer to which the present invention is applied, a callback function for receiving, from the OS, a notice about whether a process is created and a callback function for receiving a notice about whether an image corresponding to the corresponding program is driven.

Next, in step S410, the process information acquisition unit 320 receives, from the OS, a notice about whether a process corresponding to a program whose execution is instructed by a user is created, using the callback function registered in the OS.

Next, in step S420, the process determination unit 330 determines a type of the program whose execution is instructed by the user, through the callback function registered in the OS.

When it is determined that the program whose execution is instructed by the user is not an injection target of an application module, the injection operation of the application module is terminated. Unlike this, when it is determined that the program whose execution is instructed by the user is the injection target of an application module, the process determination unit 330 determines whether the process input from the OS is a process in which injection of the application module has already been completed in step S430.

When it is determined that the process input from the OS is the process in which injection of the application module has already been completed, the injection operation of the application module is terminated. Unlike this, when it is determined that the process input from the OS is not the process in which injection of application module has already been completed, the process determination unit 330 finally confirms a corresponding process as the injection target process of the application module in step S440.

A process of determining whether the program whose execution is instructed by the user is the injection target of the application module and a process of determining whether injection of the application module is terminated may be performed in a different order.

Next, in step S450, the context change unit 340 changes an entry point included in a context of a thread corresponding to the process that has been confirmed as the injection target process of the application module into an entry point of the injected application module.

Next, in step S460, the application module injection unit 350 injects the application module in the process corresponding to the program whose execution is instructed by the user.

Figure 5:
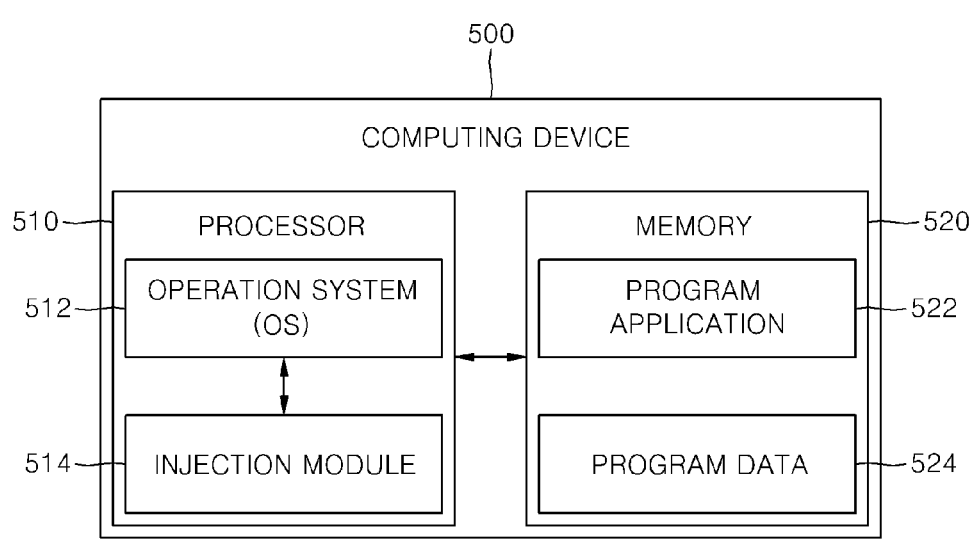
FIG. 5 is a drawing showing a configuration of a computing device including an application module injection function according to a preferred embodiment of the present invention.

FIG. 5 is a drawing showing a configuration of a computing device including an application module injection function according to a preferred embodiment of the present invention.

Referring to FIG. 5, a computing device 500 including an application module injection function according to an embodiment of the present invention includes a processor 510 and a memory 520. The processor 510 may execute an OS 512, and the OS 512 may be stored in the memory 520. In addition, the processor 510 retrieves and executes computer program instructions from a program application 522 stored in the memory 520. In addition, the processor 510 executes an injection module 514. In this instance, the injection module 514 may be implemented in the form of a driver, automatically executed at an appropriate point of time when the OS 52 is booted, through registry setting, and implemented as one element of a common program application. The injection module 514 may be substantially the same as the application module injection device that has been described with reference to FIGS. 3 and 4, and may be implemented as software or hardware. In the memory 520, program data 524 such as documents, multimedia files, data files, and the like is stored, and the injection module 514 may use a partial space of the memory 520.

Figure 6:
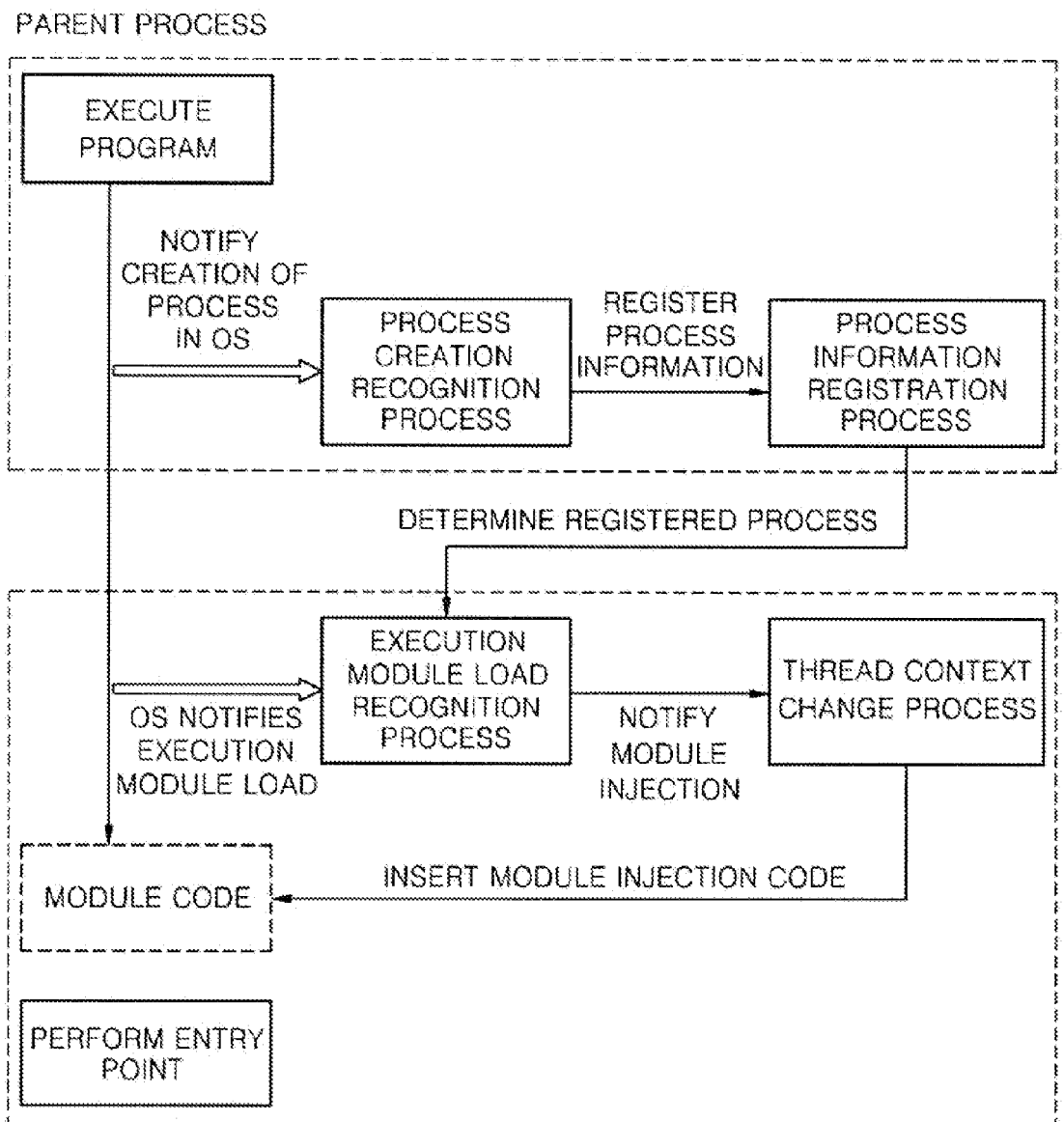
FIG. 6 is a drawing showing a process of injecting an application module in a computing device including an application module injection function according to a preferred embodiment of the present invention.

FIG. 6 is a drawing showing a process of injecting an application module in a computing device including an application module injection function according to a preferred embodiment of the present invention.

In FIG. 6, an example in which an application module is injected in a target process in a computing device using Microsoft Windows as an OS is illustrated.

Referring to FIG. 6, when a user enters an execution instruction with respect to a specific program (for example, notepad.exe), the OS 512 notifies the injection module 514 of process creation using a first callback function (for example, process create notify callback), and the injection module 514 performs a recognition process with respect to the created process. The recognition process with respect to the process is performed by the process information acquisition unit 320 of the injection module 514.

Next, when an image corresponding to the target process is loaded as a creation and execution procedure of the target process is performed, the OS 512 notifies the injection module 514 of the loading of the executed module using a second callback function (for example, image load notify callback), and the injection module 514 performs a recognition process with respect to the executed module. The recognition process with respect to the executed module is performed by the process determination unit 330 of the injection module 514. In this instance, the injection module 514 determines whether the corresponding executed module has a program type (for example, execution program whose file type is exe) that is set as an injection target of an application module. When it is determined that the corresponding executed module has the program type set as the injection target of the application module, the injection module 514 controls to perform injection of the application module in the corresponding executed module. In addition, the injection module 514 determines whether the corresponding process is a process in which injection of the application module has been completed. When it is determined that the corresponding process is a process in which injection of the application module is not performed, the injection module 514 registers information about the corresponding process (that is, process identification (ID) information, thread ID information, and the like that have been acquired through the registered callback function). This registration process includes a method of providing the information about the corresponding process to the context change unit 340 by the process determination unit 330 described with reference to FIG. 3, a method of storing the information about the corresponding process by the process determination unit 330, and a method of reading the information from the memory 360 by the context change unit 340. In this instance, the memory 360 included in the application module injection device shown in FIG. 3 may be the same component as the memory 520 included in the computing device shown in FIG. 5.

Next, the injection module 514 changes an entry point of a thread context corresponding to the corresponding process into an entry point of a code corresponding to the application module. Such a change of the entry point is performed by the context change unit 340 of the injection module 514 as described above with reference to FIG. 3.

Finally, the injection module 514 injects the application module in the target process, and therefore the application module is loaded. Such an injection of the application module is performed by the application module injection unit 350 of the injection module 514 as described above with reference to FIG. 3.

In addition, the application module includes a routine for calling an original entry point, and therefore the original entry point is called after the injected application module is loaded, and execution with respect to the target process is performed.

The present invention can be implemented as computer-readable codes in a computer-readable recording medium. The computer-readable recording medium includes all types of recording media in which computer-readable data is stored. Examples of the computer-readable recording medium include a ROM, a RAM, a CD-ROM, a magnetic tape, a floppy disk, and an optical data storage device. Further, the recording medium may be implemented in the form of carrier waves such as those employed in Internet transmission. In addition, the computer-readable recording medium may be distributed to computer systems over a network, in which computer-readable codes may be stored and executed in a distributed manner.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A computing device comprising:
 a processor configured to execute an OS and an injection module; and
 a memory configured to store the OS and the injection module,
 wherein the injection module includes
 a function registration module configured to register, in the OS, a first callback function for receiving a notice about whether a process corresponding to a program whose execution is instructed by a user is created from the OS and a second callback function for receiving a notice about whether an image corresponding to the program whose execution is instructed by the user is driven,
 a process information acquisition module configured to receive the notice about whether the process corresponding to the program whose execution is instructed by the user is created from the OS through the first callback function;
 a process determination module configured to select a process generated so as to correspond to the program whose execution is instructed by the user as an application module injection target process when the program whose execution is instructed by the user, which is determined through the second callback function, corresponds to a predetermined type of program;
 a context change module configured to change a first entry point included in a context of a thread corresponding to the application module injection target process into a second entry point of an injected application module, and
 an application module injection module configured to inject the application module into the application module injection target process,
 wherein the injection module is operated in a kernel mode,
 wherein the process determination module selects the process whose creation has been informed from the OS as the application module injection target process, when the process is not included in a list of processes whose injection is completed.

2. A non-transitory computer-readable recording medium that records a program for executing an application module injection method in a computer,
 wherein the application module injection method includes
 (a) receiving, from an OS, a notice about whether a process corresponding to a program whose execution is instructed by a user is created,
 (b) receiving, from the OS, a notice about whether an image corresponding to the program whose execution is instructed by the user is driven,
 (c) selecting a process generated so as to correspond to the program whose execution is instructed by the user as an application module injection target process when the program whose execution is instructed by the user corresponds to a predetermined type of program,
 (d) changing a first entry point included in a context of a thread corresponding to the application module injection target process into a second entry point of an injected application module, and
 (e) injecting the application module into the application module injection target process,
 wherein step (a) to (e) are executed in a kernel mode,
 wherein, in step (c), the process whose creation has been informed from the OS is selected as the application module injection target process, when the process is not included in a list of processes whose injection is completed, and
 wherein, before step (a), the application module injection method further includes registering, in the OS, a first callback function for receiving a notice about whether the process corresponding to the program whose execution is instructed by the user is created from the OS and a second callback function for receiving a notice about whether the image corresponding to the program whose execution is instructed by the user is driven.

3. The computing device of claim 1, wherein the application module includes a routine that calls the first entry point.

4. The non-transitory computer-readable recording medium of claim 2, wherein the application module includes a routine of calling the first entry point.

5. The computing device of claim 1, wherein the application module is a code for digital copyright management.

6. The non-transitory computer-readable recoding medium of claim 2, wherein the application module is a code for digital copyright management.

* * * * *